(12) United States Patent
Kinoshita et al.

(10) Patent No.: US 7,322,453 B2
(45) Date of Patent: Jan. 29, 2008

(54) LOCKUP CLUTCH ASSEMBLY

(75) Inventors: Yoshio Kinoshita, Fukuroi (JP); Shiro Takeuchi, Fukuroi (JP); Tatsuro Miyoshi, Fukuroi (JP); Shigeki Umezawa, Fukuroi (JP); Shun Kitahara, Fukuroi (JP); Tamotsu Fujii, Fukuroi (JP); Hiroyuki Kinpara, Fukuroi (JP); Kenji Maruo, Fukuroi (JP); Tomoyuki Miyazaki, Fukuroi (JP); Xiaoming Gu, Fukuroi (JP); Fumimasa Muramatsu, Fukuroi (JP); Shigeharu Nishimura, Fukuroi (JP); Ritsuo Toya, Fukuroi (JP)

(73) Assignee: NSK- Warner K.K., Tokyo (JP)

( * ) Notice: Subject to any disclaimer, the term of this patent is extended or adjusted under 35 U.S.C. 154(b) by 246 days.

(21) Appl. No.: 11/302,116

(22) Filed: Dec. 14, 2005

(65) Prior Publication Data

US 2006/0124419 A1 Jun. 15, 2006

(30) Foreign Application Priority Data

Dec. 14, 2004 (JP) ............................. 2004-360796
Oct. 20, 2005 (JP) ............................. 2005-305260

(51) Int. Cl.
*F16D 33/00* (2006.01)
(52) U.S. Cl. ..................................... 192/3.28
(58) Field of Classification Search ........... 192/107 M, 192/3.28, 3.29
See application file for complete search history.

(56) References Cited

U.S. PATENT DOCUMENTS 4,469,206 A 9/1984 Motomura et al.

FOREIGN PATENT DOCUMENTS

JP 57-140920 A 8/1982
JP 5-99297 A 4/1993

*Primary Examiner*—Dirk Wright
(74) *Attorney, Agent, or Firm*—Crowell & Moring LLP (57) ABSTRACT

In a lockup clutch assembly for use in a torque converter, a friction lining attached to one of a clutch piston and a front cover of the torque converter is divided into an outer-circumference-side friction lining and an inner-circumference-side friction lining. The outer-circumference-side friction lining contains as a filler diatomaceous earth in a higher proportion than the inner-circumference-side friction lining.

4 Claims, 7 Drawing Sheets

LOCKUP CLUTCH ASSEMBLY

FIELD OF THE INVENTION

This invention relates to a lockup clutch assembly, which is useful in a torque converter of an automatic transmission and can prevent a shudder caused by a stick-slip.

DESCRIPTION OF THE BACKGROUND

Figure 1:
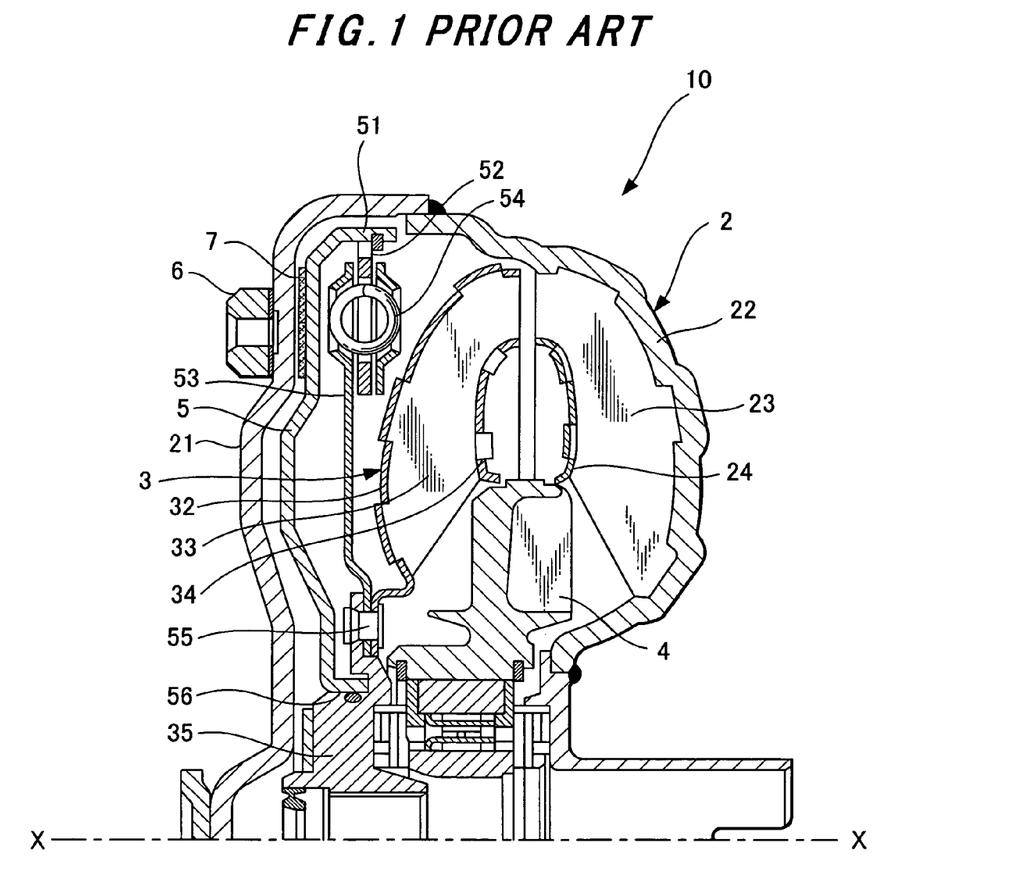
FIG. 1 is a cross-sectional view showing the fundamental construction of a torque converter equipped with a lockup clutch assembly.

FIG. 1 is a cross-sectional view showing the fundamental construction of a torque converter equipped with a lockup clutch assembly. A torque converter 10 comprises a pump section 2, a turbine section 3, and a stator 4. FIG. 1 also illustrates a front cover 21, an outer shell 22, blade 23 and inner core 24 of the pump section 2, an outer shell 32, blade 33 and inner core 34 of the turbine section 3, and a turbine hub 35.

Also shown in FIG. 1 are a clutch piston 5, a damper support portion 51, damper 52, damper plate 53 and damper spring 54 of the lockup clutch assembly. The outer shell 32 of the turbine section 3, the turbine hub 35 and the damper plate 53 are joined together by a rivet 55. Designated at numeral 56 is a hole located centrally in the piston 5, and through the hole 56, the turbine hub 35 extends. Numeral 7 indicates a friction lining bonded to a clutch-engaging portion of the clutch piston 5. It is to be noted that this friction lining may be bonded to the side of the front cover 21. Numeral 6 designates a coupling welded on the front cover 21 and adapted to connect the torque converter to an engine. An alternate long-and-short dash line X-X indicates a central axis of the whole torque converter.

In recent years, there is an increasing tendency toward actuating a lockup clutch assembly even from a low vehicle-speed range to improve the fuel economy. Reflecting this tendency, slip control is increasingly performed these days. In such slip control, the lockup clutch assembly involves a problem in that a clutch piston and a damper or the like act as a shuddering body and a resilient body, respectively, and vibrations called a shudder occur as a result of a stick-slip of a friction lining.

A friction lining is formed from fibers, a filler, a friction modifier, and a resin dissolved in a solvent. As the solvent evaporates, the resin located inside the green friction lining progressively moves together with the solvent close to the surface. A high resin-proportion layer with the resin contained at a high concentration is, therefore, formed near the surface of the friction lining. The friction lining has a high coefficient of friction when the slip rotation speed is low, but a low coefficient of friction when the slip rotation speed becomes high. In other words, the μ-v characteristics of the friction lining have a negative gradient, thereby causing a shudder by a stick-slip when the clutch is brought into engagement. It is to be noted that the expression "slip rotation speed" as used herein means a difference in rotation speed between a member with a friction lining bonded thereon and another member having a counterpart friction surface.

It has, therefore, been a conventional practice to remove the high resin-proportion layer from the surface of the friction lining and further to subject the friction lining to cutting on the side of its outer circumference such that the surface is rendered smooth. This cutting is usually performed in automatic transmission fluid. The automatic transmission fluid, therefore, adheres to the product, leading to a deterioration in the working environment. Moreover, the need for the cutting results in higher manufacturing cost.

It was, therefore, contemplated to divide a friction lining into an outer-circumference-side friction lining and an inner-circumference-side friction lining, to make the proportion of a filler higher in the outer-circumference-side friction lining than in the inner-circumference-side friction lining to provide the μ-v characteristics of the friction lining with a positive gradient, in other words, such that the coefficient of friction becomes higher with the slip rotation speed to inhibit a shudder by a stick-slip; and further, to make higher the proportion of fibers in the inner-circumference-side friction lining to provide the inner-circumference-side friction lining with flexibility and to increase the sealing property and contact area of its friction surface and hence the coefficient of static friction, thereby making the lock-up capacity greater.

As a result of research, it became clear that among fillers, it is diatomaceous earth that is effective for the inhibition of a shudder. Recently, there is a tendency toward referring a combination of a filler and a friction modifier simply as "a filler".

It was also found that, even if the proportion of fibers is not made specifically higher in an inner-circumference-side friction lining than in an outer-circumference-side friction lining, the coefficient of static friction of the inner-circumference-side friction lining can still be made higher than that of the outer-circumference-side friction lining by adjusting the proportion of the filler including a friction modifier.

SUMMARY OF THE INVENTION

The present invention has been completed based on the above-described research. In one aspect of the present invention, there is thus provided a lockup clutch assembly for use in a torque converter, wherein a friction lining attached to one of a clutch piston and a front cover of the torque converter is divided into an outer-circumference-side friction lining and an inner-circumference-side friction lining; and the outer-circumference-side friction lining contains diatomaceous earth in a higher proportion than the inner-circumference-side friction lining.

In the present invention, the friction lining of the lockup clutch assembly is divided into the outer-circumference-side friction lining and the inner-circumference-side friction lining, and the proportion of diatomaceous earth is made higher in the inner-circumference-side friction lining than in the outer-circumference-side friction lining to provide a higher coefficient of dynamic friction. The friction lining is, therefore, provided with μ-v characteristics of positive gradient without needing any cutting removal of a high resin-proportion layer, thereby making it possible to inhibit the occurrence of a shudder by a stick-slip in an initial stage of clutch engagement. It is no longer necessary to apply cutting to the outer circumference side of the friction lining after the fabrication. The omission of such cutting has made it possible to avoid the adherence of automatic transmission fluid to the product and hence, to avoid a deterioration in the working environment. Moreover, the omission of such cutting has also made it possible to avoid an increase in manufacturing cost.

DETAILED DESCRIPTION OF THE INVENTION AND PREFERRED EMBODIMENTS

In the present invention, the friction lining is divided into the outer-circumference-side friction lining and the inner-circumference-side friction lining, and the proportion of diatomaceous earth as a filler is made higher in the outer-circumference-side friction lining than in the inner-circumference-side friction lining. The proportion of diatomaceous earth can be made higher in the entire outer-circumference-side friction lining, or can be made higher only near a sliding surface of the friction lining. Preferably, the outer-circumference-side friction lining can be made thicker than the inner-circumference-side friction lining to achieve closer contact upon bringing the clutch into engagement.

The coefficient of static friction of the inner-circumference-side friction lining can also be made higher by adjusting the proportion of the filler, including a friction modifier, other than making higher the proportion of fibers in the inner-circumference-side friction lining.

It is also possible to increase the joint strength between the outer-circumference-side friction lining and the inner-circumference-side friction lining by applying pressing to a seam portion between the outer-circumference-side friction lining and the inner-circumference-side friction lining. In addition, owing to a groove formed at the seam portion, the hydraulic pressure can be made even on the surface of the friction lining.

A description will next be made about common components of a paper friction lining which is a typical friction lining. The paper friction lining is formed of a sheet of paper and a resin. The sheet of paper is composed of fibers and a filler which contains a friction modifier. Examples of the fibers include natural pulp fibers such as cotton and hemp; organic synthetic fibers such as aromatic polyamide fibers and phenol fibers; and inorganic fibers such as carbon fibers, glass fibers and ceramic fibers.

Examples of the filler include diatomaceous earth, clay, wollastonite, silica, and carbonates. Illustrative of the friction modifier are resin particles, rubber particles, graphite, and coke. Further, examples of the resin include phenol resins and modified phenol resins. These modified phenol resins in turn include, for example, cresol-modified phenol resins, melamine-modified phenol resins, and oil-modified phenol resins.

With reference to the accompanying drawings, certain preferred embodiments of the present invention will hereinafter be described.

Figure 2:
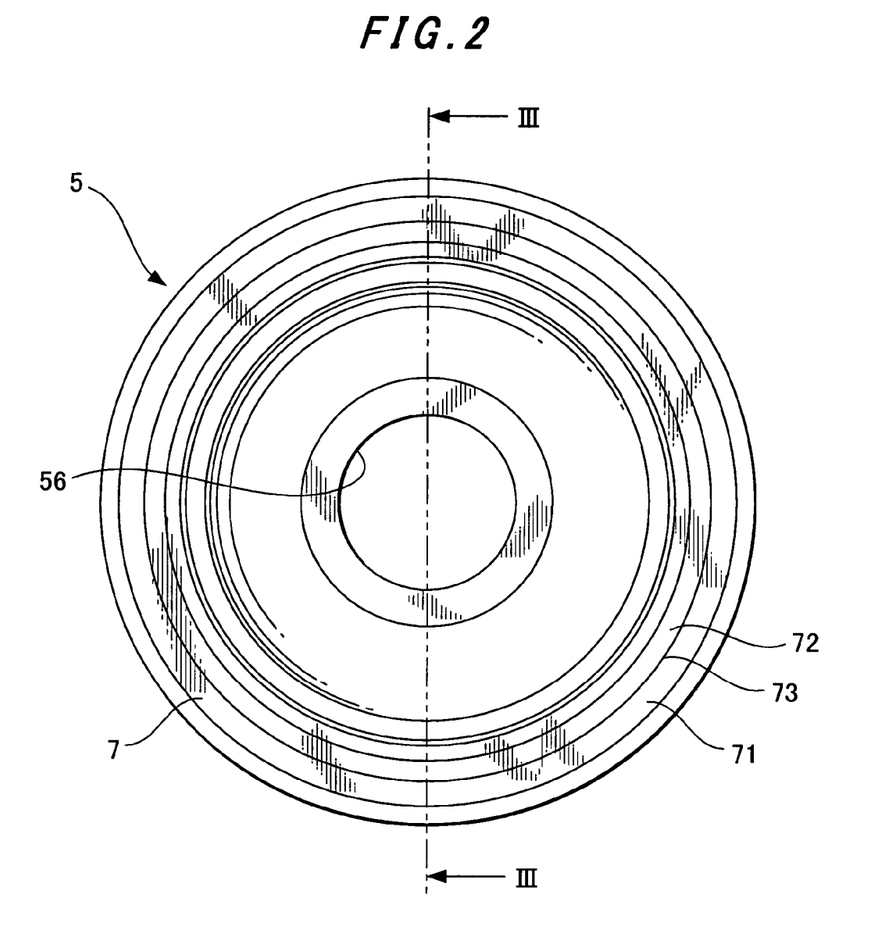
FIG. 2 is a front view of a piston in a lockup clutch assembly according to a first embodiment of the present invention as viewed at a friction surface of the piston.
Figure 3:
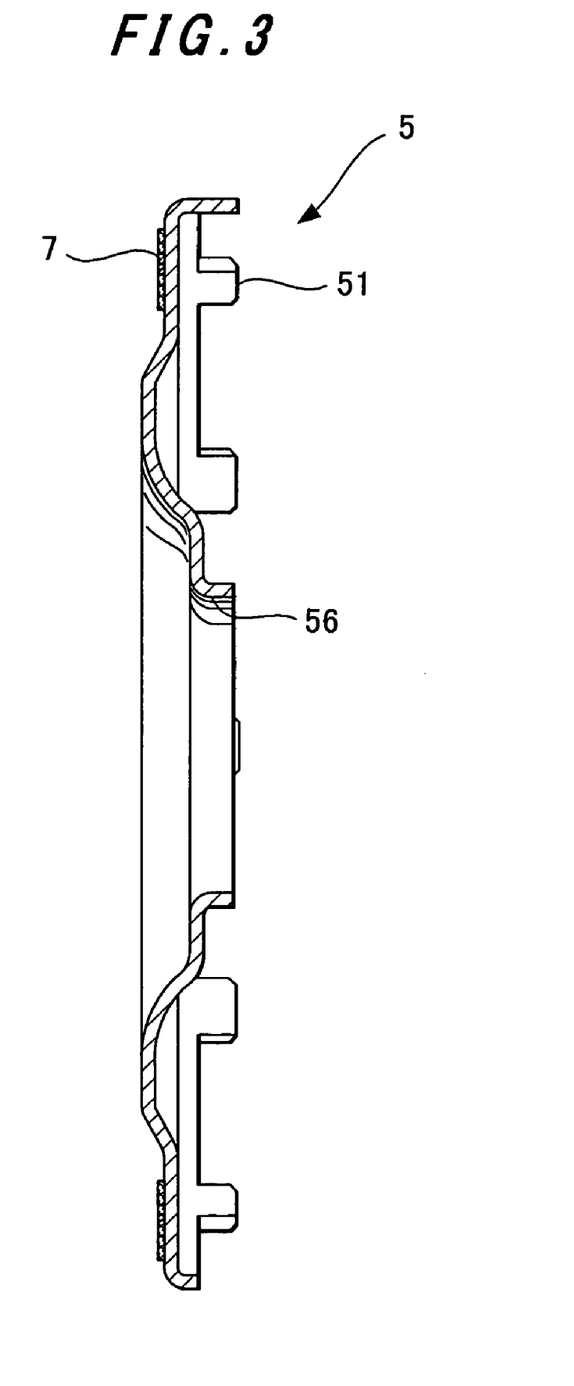
FIG. 3 is cross-sectional view of the piston, taken in the direction of arrows III-III of FIG. 2.
Figure 4:
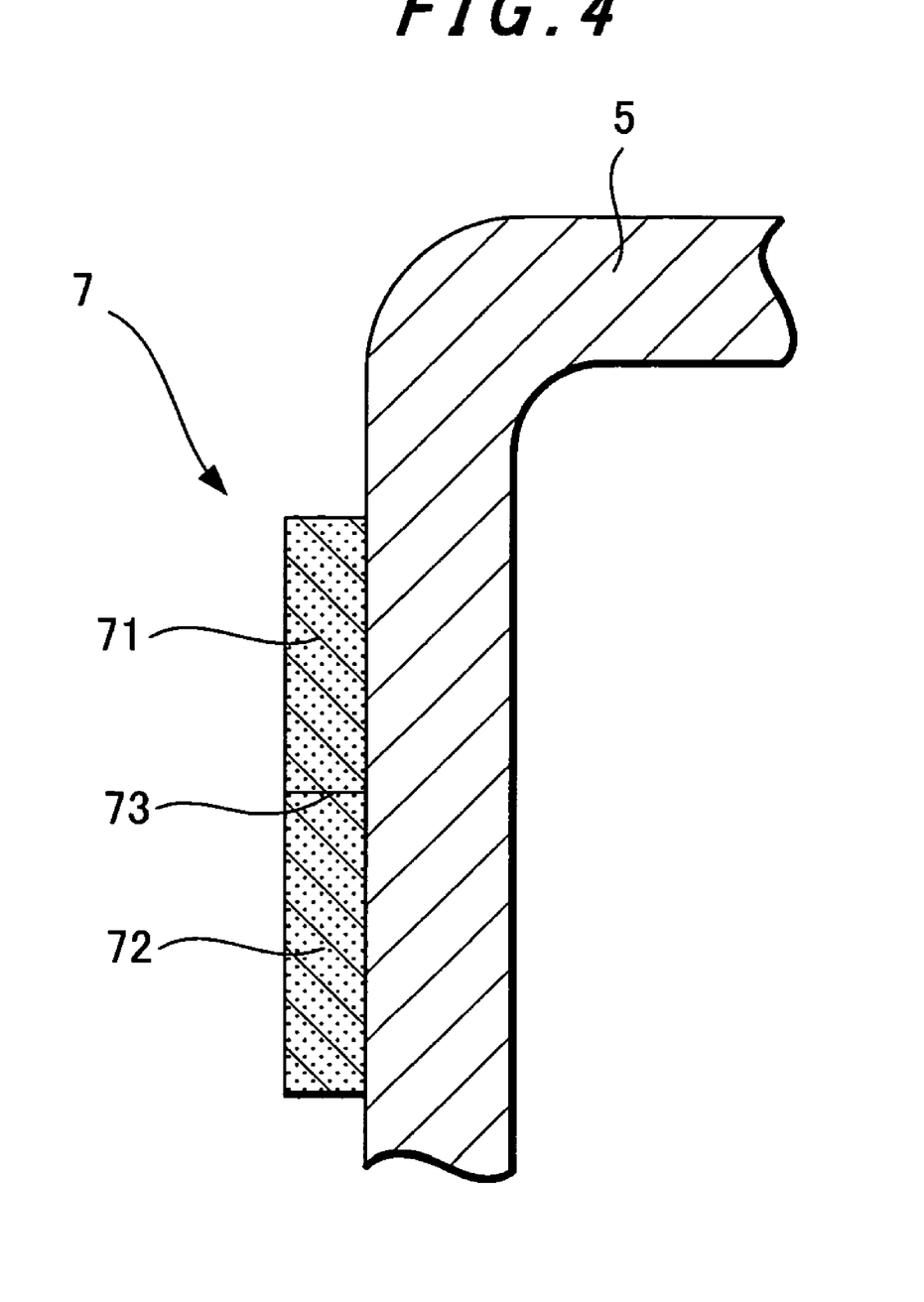
FIG. 4 is an enlarged cross-sectional view of a friction-lining-bonded portion of FIG. 2.
Figure 5:
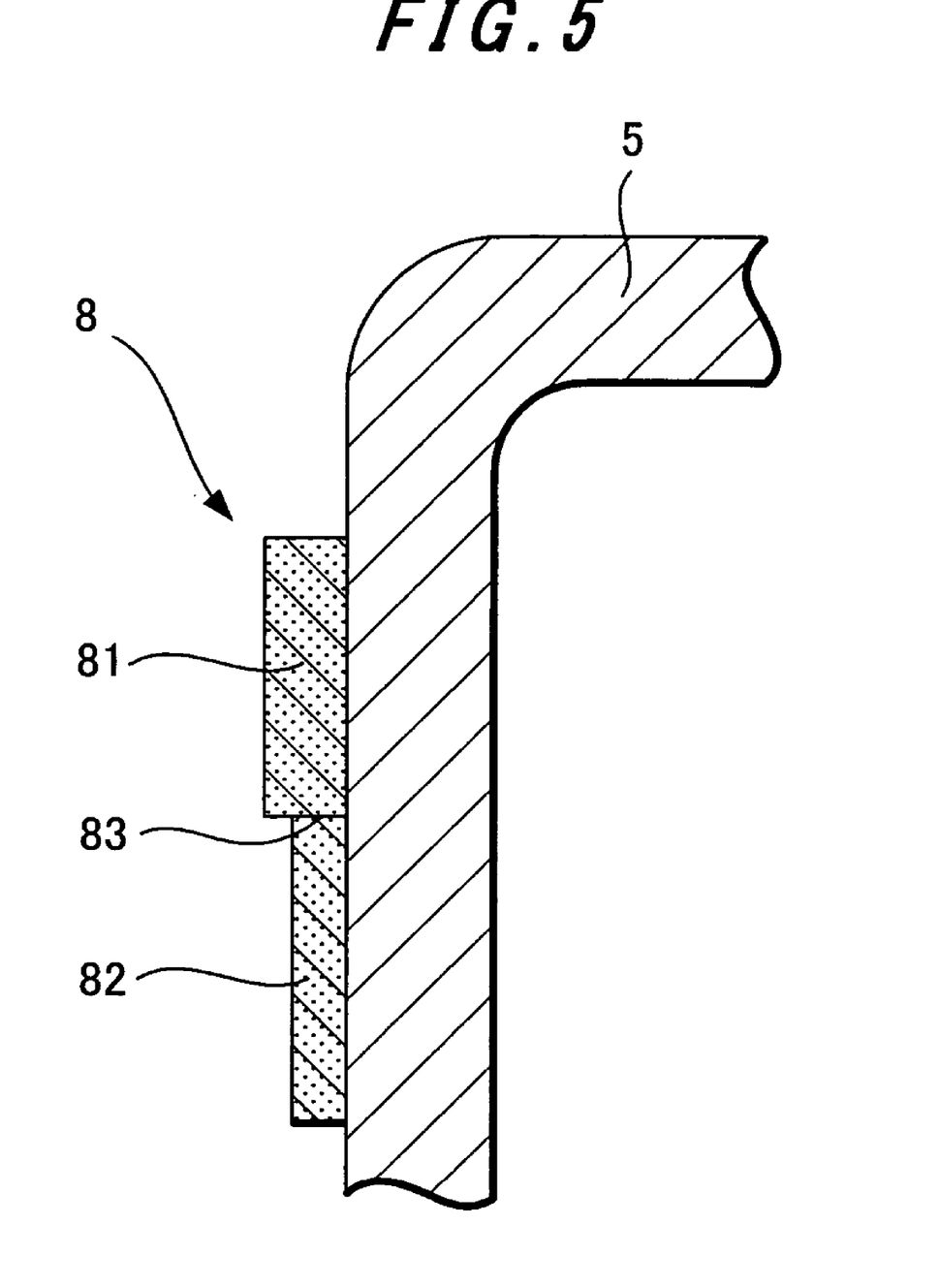
FIG. 5 is an enlarged cross-sectional view similar to FIG. 4, and illustrates a friction-lining-bonded portion of a piston in a lockup clutch assembly according to a second embodiment of the present invention.

Referring first to FIGS. 2 through 4, the lockup clutch assembly according to the first embodiment will be described. In FIG. 4, a friction lining 7 is composed of an outer-circumference-side friction lining 71 and an inner-circumference-side friction lining 72. Designated at numeral 73 is a seam between the outer-circumference-side friction lining 71 and the inner-circumference-side friction lining 72. The outer-circumference-side friction lining 71 and the inner-circumference-side friction lining 72 have the same thickness. In the lockup clutch assembly according to the second embodiment of the present invention as illustrated in FIG. 5, a friction lining 8 is composed of an outer-circumference-side friction lining 81 and an inner-circumference-side friction lining 82. Numeral 83 indicates a seam between the outer-circumference-side friction lining 81 and the inner-circumference-side friction lining 82. The outer-circumference-side friction lining 81 is greater in thickness than the inner-circumference-side friction lining 82.

The outer-circumference-side friction lining 71 has a higher proportion of diatomaceous earth as a filler than the inner-circumference-side friction lining 72, so that the friction lining 7 is provided with μ-v characteristics of positive gradient to prevent a stick-slip upon bringing the clutch into engagement and hence, to inhibit the occurrence of a shudder. The proportion of diatomaceous earth can be made higher either in the whole outer-circumference-side friction lining 71 or only in its sliding surface In the inner-circumference-side friction lining 72, on the other hand, the proportion of the filler, including the friction modifier, may preferably be adjusted to provide a higher coefficient of static friction such that a large torque capacity is obtained at the time of completion of clutch engagement.

The followings are examples of the compositions of the outer-circumference-side friction lining 71 and inner-circumference-side friction lining 72.

Outer-circumference-side Friction Lining 71

| Fibers | Cellulose fibers: 10 to 30% |
| | Aramid fibers: 10 to 30% |
| Filler | Diatomaceous earth: 25 to 40% |
| Resin | Phenol resin: 40 to 80% |

Inner-circumference-side Friction Lining 72

| Fibers | Cellulose fibers: 20 to 35% |
| | Aramid fibers: 5 to 20% |
| Filler | Diatomaceous earth: 10 to 25% |
| Resin | Phenol resin: 40 to 80% |

At the time of completion of clutch engagement, a central part of the piston 5 is flexed toward the front cover 21 under hydraulic pressure. To bring the friction lining 7 into close contact at its entire surface with the opposite surface at that time, the outer-circumference-side friction lining 81 is formed thicker than the inner-circumference-side friction lining 82 as illustrated in FIG. 5. In an initial stage of clutch engagement, the friction lining 8 therefore begins to contact at the outer-circumference-side friction lining 81. As the outer-circumference-side friction lining 81 contains diatomaceous earth as a filler in the higher proportion and is provided with the μ-v characteristics of positive gradient as mentioned above, the occurrence of a shudder by a stick-slip can be inhibited. When the friction lining 8 is brought into engagement at the entire surface thereof with the front cover 21, the friction lining 8 is maintained in still closer contact with the front cover 21 because the inner-circumference-side friction lining 82 is provided with the higher coefficient of static friction. Owing to the greater thickness of the outer-circumference-side friction lining 81, the friction surface of the friction lining 8 extends in parallel with the friction surface on the side of the front cover 21 when the central part of the piston 5 is flexed toward the front cover 21 under hydraulic pressure upon engagement of the clutch. As a consequence, the friction lining 8 is brought into close contact at the entire surface thereof with the friction surface of the front cover 21 to produce an even contact pressure therebetween.

Figure 6:
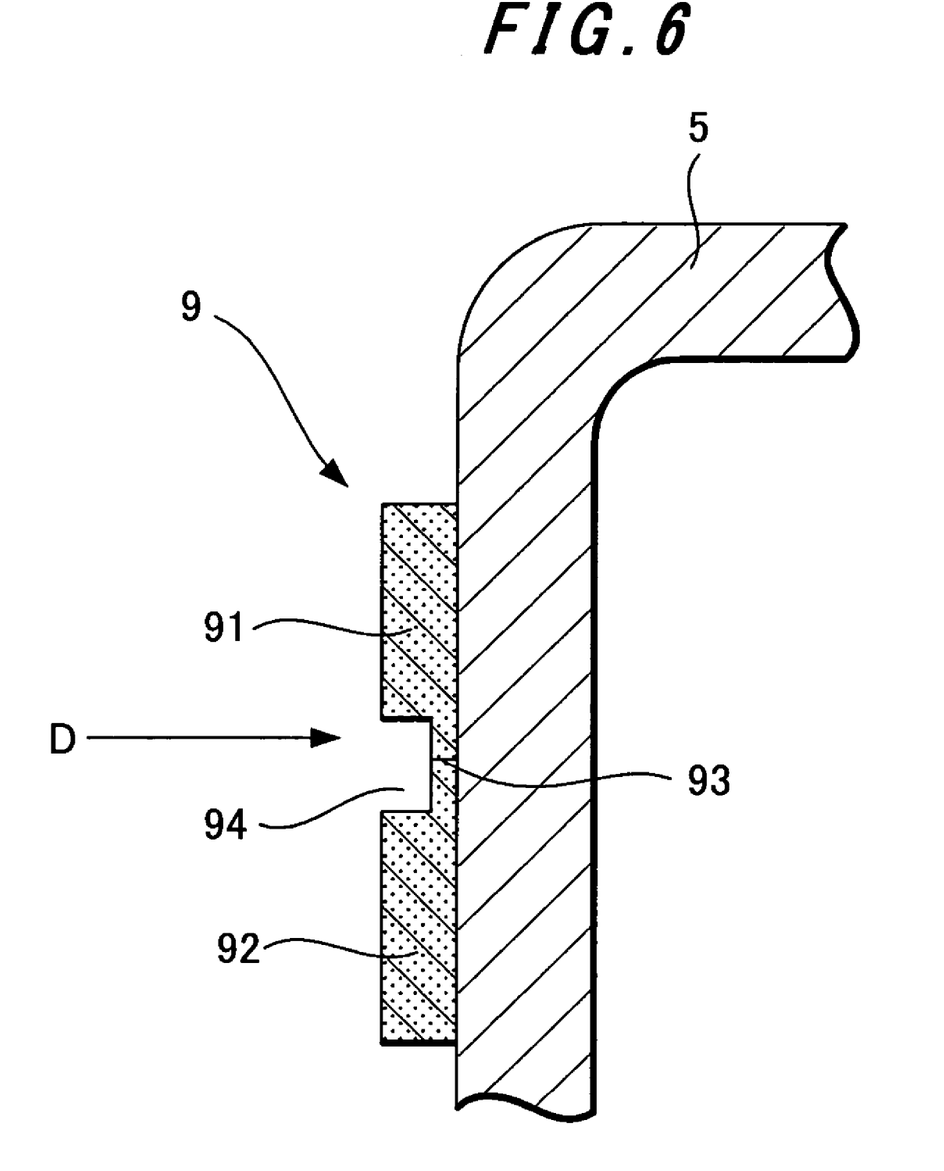
FIG. 6 is an enlarged cross-sectional view similar to FIG. 4, and depicts a friction-lining-bonded portion of a piston in a lockup clutch assembly according to a third embodiment of the present invention.
Figure 7:
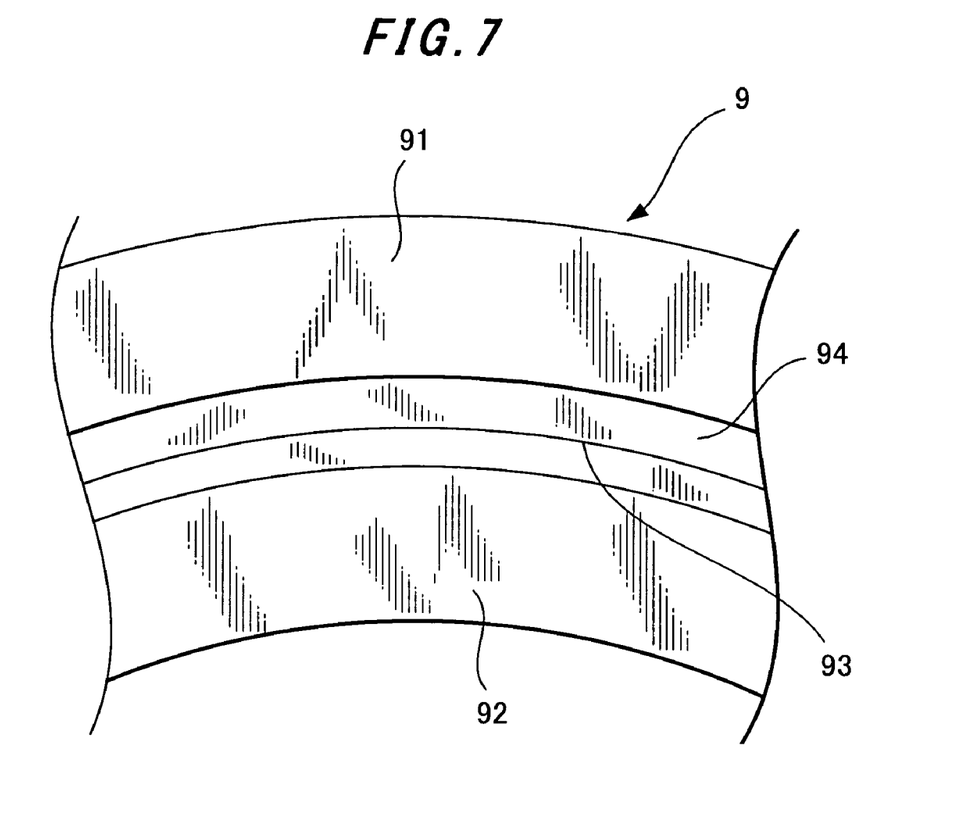
FIG. 7 is a front view of the friction-lining-bonded portion of FIG. 6.

The lockup clutch assembly according to the third embodiment of the present invention will next be described with reference to FIGS. 6 and 7. By subjecting an outer-circumference-side friction lining 91 and an inner-circumference-side friction lining 92 to pressing at a seam portion between them including a seam 93 and their proximal end portions around the seam 93, the joint strength between the outer-circumference-side friction lining 91 and the inner-circumference-side friction lining 92 can be increased. Further, a groove 94 is formed by the pressing. This groove 94 may be in an arcuate form or in an annular form extending over the entire circumference of the clutch piston 5. This groove 94 serves to make even the hydraulic pressure on the friction surface, thereby further improving the shudder-preventing effect.

This application claims the priorities of Japanese Patent Application 2004-360796 filed Dec. 14, 2004 and Japanese Patent Application 2005-305260 filed Oct. 20, 2005, both of which are incorporated herein by reference.

The invention claimed is:

1. A lockup clutch assembly for use in a torque converter, wherein:

a friction lining attached to one of a clutch piston and a front cover of said torque converter is divided into an outer-circumference-side friction lining and an inner-circumference-side friction lining; and said outer-circumference-side friction lining contains diatomaceous earth in a higher proportion than said inner-circumference-side friction lining.

2. A lockup clutch assembly according to claim 1, wherein said outer-circumference-side friction lining contains diatomaceous earth in a higher proportion in a sliding surface thereof than said inner-circumference-side friction lining.

3. A lockup clutch assembly according to claim 1, wherein said outer-circumference-side friction lining and said inner-circumference-side friction lining have been subjected to pressing at a seam portion therebetween such that said outer-circumference-side friction lining and said inner-circumference-side friction lining are provided with an improved joint strength and a groove is formed at said seam portion.

4. A lockup clutch assembly according to claim 1, wherein said outer-circumference-side friction lining is higher in thickness than said inner-circumference-side friction lining.

* * * * *